United States Patent [19]
Hatch

[11] 3,965,942
[45] June 29, 1976

[54] MULTI-PLY WOVEN ARTICLE HAVING STIFFENING ELEMENTS BETWEEN DOUBLE PLIES

[75] Inventor: Donald M. Hatch, Huntington Beach, Calif.

[73] Assignee: Hitco, Irvine, Calif.

[22] Filed: Oct. 9, 1974

[21] Appl. No.: 513,315

Related U.S. Application Data

[63] Continuation of Ser. No. 290,541, Sept. 20, 1972, abandoned.

[52] U.S. Cl. ........................... 139/384 R; 139/410; 428/116; 428/117; 428/119; 428/120; 428/188; 428/225; 428/257
[51] Int. Cl.² ........................................... D03D 3/00
[58] Field of Search .................. 161/72, 49, 88, 98, 161/68, 69, 127; 139/384 R, 410; 428/225, 257, 116, 117, 119, 120, 188

[56] References Cited
UNITED STATES PATENTS

| | | | |
|---|---|---|---|
| 3,090,406 | 5/1963 | Koppelman et al.............. | 139/410 |
| 3,481,427 | 12/1969 | Dobbs et al...................... | 181/50 |
| 3,538,957 | 11/1970 | Rheaume......................... | 139/410 |
| 3,575,776 | 4/1971 | MacIntyre........................ | 139/410 |

*Primary Examiner*—James J. Bell
*Attorney, Agent, or Firm*—Fraser and Bogucki

[57] ABSTRACT

A multi-ply woven article has stiffening elements positioned within pockets formed by double plies of the article to provide the article with substantial strength and rigidity. The double plies may comprise a generally parallel pair of rib plies which extend between the opposite faces of the article in generally zig zag fashion to form a plurality of intermediate rib portions, or a pair of generally parallel, spaced apart face plies forming each of the opposite faces of the article, or both. The various stiffening elements may comprise one or more layers of relatively stiff material. The various layers comprising each stiffening element may comprise unidirectional fibers or materials oriented relative to the woven article so as to impart maximum strength in selected directions. In a preferred method of making woven articles in accordance with the invention the multi-ply fabric is woven and the individual stiffening elements are made, after which the woven fabric is resin impregnated, the pockets thereof filled with the stiffening elements and open spaces in the fabric filled with mandrels. Thereafter the fabric is cured and the mandrels subsequently removed to form the finished article.

8 Claims, 15 Drawing Figures

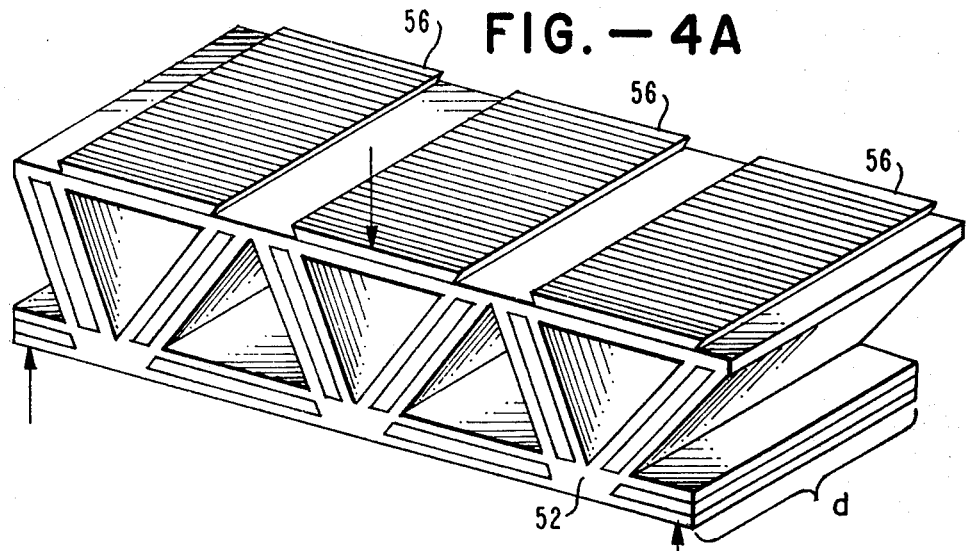
FIG. — 4A
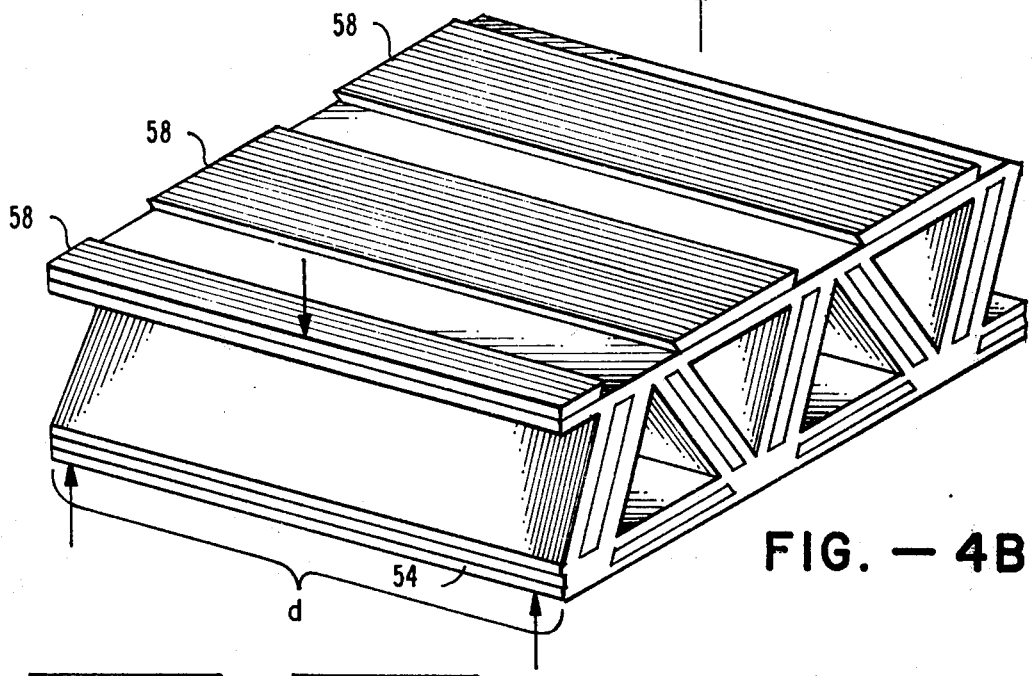
FIG. — 4B
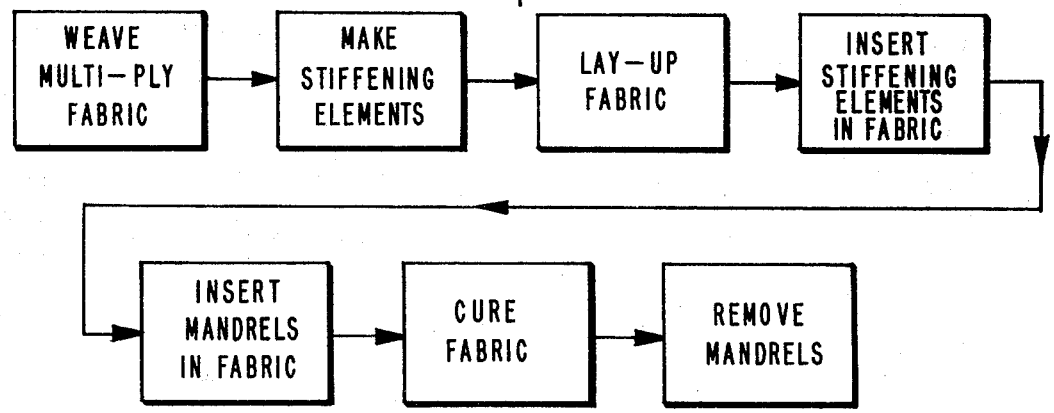
FIG. — 5

FIG.—7A
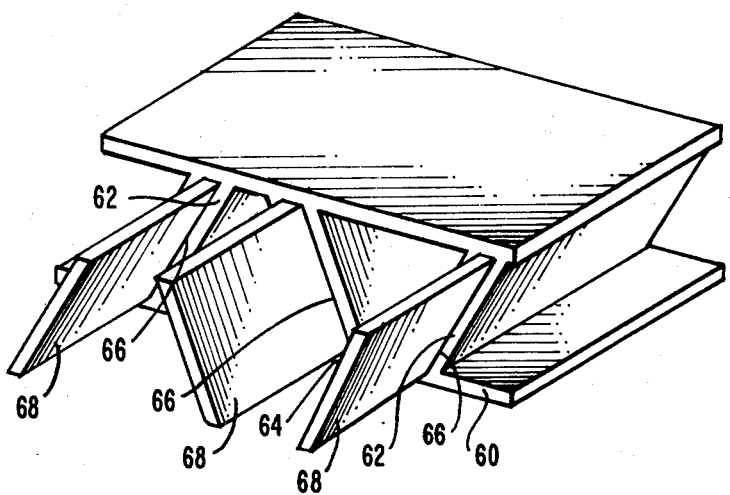
FIG.—7B
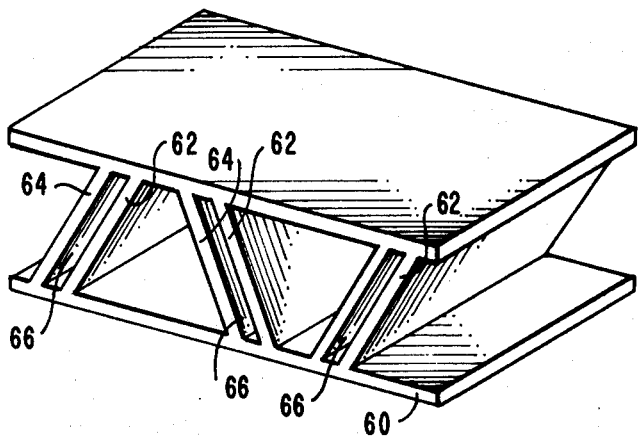
FIG.—6
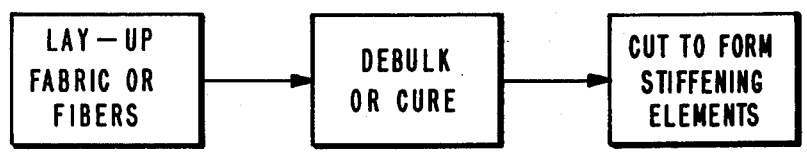

MULTI-PLY WOVEN ARTICLE HAVING STIFFENING ELEMENTS BETWEEN DOUBLE PLIES

This is a continuation of application Ser. No. 290,541, filed Sept. 20, 1972, now abandoned.

BACKGROUND OF THE INVENTION

1. Field of the Invention

The present invention relates to woven fabric articles, and more particularly to multi-ply woven fabric articles of the type which may be provided with internal stiffening elements and rigidified such as by resin impregnation to provide a strong and yet lightweight structural panel.

2. History of the Prior Art

Woven multi-ply, three-dimensional fabrics of the type having opposite woven face plies and a plurality of intermediate woven ribs which extend between and are interwoven with the face plies are well known in the art. Such fabrics have proven capable of being reinforced such as by the insertion of stiffening elements into the open spaces therein and rigidified such as by resin impregnation to provide panels which are strong, yet lightweight and inexpensive. The uses for such panels are virtually unlimited, and presently include walls, roofs, floors, airframe components, and insulation.

Examples of multi-ply, three-dimensional woven fabric articles and the methods of making the same are provided by U.S. Pat. No. 3,090,406 of Koppelman et al, issued May 21, 1963. As described in Koppelman et al a multi-ply, three-dimensional fabric may be woven on a conventional shuttle loom so as to have opposite face plies and an intermediate rib ply which zig zags between and is interwoven with the opposite face plies.

The woven fabric disclosed in the Koppelman et al patent has proven to be highly useful in the manufacture of panels for a wide variety of applications. Upon weaving of such fabrics mandrels are typically inserted within the triangular-shaped spaces therein during resin impregnation and curing so as to rigidify the structure. Frequently the triangular-shaped spaces are filled with foam elements prefabricated to the size of the triangular-shaped openings and inserted thereinto using mandrels. Where foam inserts are used they may be placed in the fabric openings prior to resin impregnation so as to hold the fabric erect and rigid during impregnation. The resulting rigidized article comprises a panel which is lightweight, strong and yet relatively inexpensive. The foam inserts, where used, add considerable strength to the article as well as enhancing the insulating properties thereof.

However fabrics of the type described suffer from a number of limitations which may render them impractical or unsuitable for certain applications. One of the most serious limitations of such fabrics is their rather low compressive strength. While the foam inserts, where used, add somewhat to the resistance of the article to compressive forces, the compressive strength as well as other structural features of the article may prove inadequate for many applications. For example panels measuring approximately ¾ inch in thickness and made of fiberglass yarns which have been resin impregnated and supported by foam fillers are typically capable of withstanding a maximum of 150 to 200 lbs. per square inch. Such articles furthermore lack the versatility which may be desired for certain applications. For example it may be highly desirable to be able to insert stiffening elements into the woven fabric so as to greatly rigidify the article between the opposite face plies. At the same time, however, it may be essential that the stiffening elements be thin so as to be light in weight or to conserve on materials, thereby making it impractical to fill the entire spaces within the woven fabric.

BRIEF SUMMARY OF THE INVENTION

Multi-ply woven articles in accordance with the invention are comprised of woven fabrics having double plies forming a plurality of generally planar pockets therebetween. The generally planar pockets are filled with elongated, generally planar stiffening elements having sizes and shapes which conform to the pockets, so as to provide the woven article with substantial strength and rigidity. The double plies forming the pockets may comprise a pair of intermediate rib plies which are generally parallel to each other and which extend between the opposite faces of the woven article in generally zig zag fashion so as to define a plurality of rib portions. Each rib portion defines one of the generally planar pockets between the opposite rib plies thereof for receiving a stiffening element. The woven article may also comprise a fabric having opposite pairs of face plies to define the opposite faces thereof. Each pair of face plies are disposed in spaced apart, generally parallel relation to each other so as to define the generally planar pockets therebetween.

Where double rib plies are present in the woven article, such plies function structurally as a plurality of trusses. Thus stiffening elements which are relatively thin and lightweight may be inserted in the pockets formed between the double rib plies to provide the woven article with substantial resistance to compressive forces without significantly increasing the overall weight or expense of the article. Similarly where double face plies form each face of the woven article, the double face plies provide for the use of thin, lightweight stiffening elements so as to greatly increase the strength of the article faces without significant increase in the weight or expense of the article.

The stiffening elements can comprise a single layer or a laminate of two or more layers of appropriate material. Where two or more layers of material are used to form each stiffening element the various layers can be comprised of the same material or of different materials, and can be oriented in different directions relative to each other. The single or plural layers of each stiffening element may comprise a unidirectional material, such as a plurality of fibers oriented in a common direction, in which case the material of the stiffening elements is oriented in a selected direction or directions relative to the woven article to provide the article with maximum strength in selected directions.

In accordance with one preferred method of making a woven article in accordance with the invention a multi-ply fabric is woven and the stiffening elements are made. In one preferred technique for making the elements a fabric or fibers are laid up such as by resin impregnation, following which the fabric or fibers are debulked and in some cases completely cured. Thereafter the debulked or cured fabric or fibers are cut so as to form the stiffening elements. Manufacture of the woven article is continued by impregnating the woven fabric with resin, inserting the formed stiffening elements in the pockets of the fabric and inserting mandrels in the open spaces of the fabric formed between the various rib portions and the faces. The fabric is then cured, following which the mandrels are removed to form the finished product.

Woven articles in accordance with the invention provide a sufficient number of variables so that the article can be custom designed for virtually any application thereof. As noted above the stiffening elements can be varied in terms of the material thereof, the number of layers used to form the elements, the orientation of such elements relative to the woven fabric, and the size, particularly the thickness, of the elements. The thickness of each of the rib portions or trusses formed by a pair of rib plies with a stiffening element therebetween can be controlled by varying the width of the stiffening elements, by varying the weaving process and thereby the distance between the adjacent rib plies, or by eliminating the stiffening element completely in the finished product such as by use during fabrication of a stiffening element made of a material which will burn out during curing of the article. The size and other characteristics of the faces can be greatly varied in accordance with the invention. Where a single face ply forms each face of the woven article, such face plies can be build up during fabrication of the article by bonding one or more layers of the same type of materials are used to form the stiffening elements onto one or both face plies of the article. Where each face is comprised of two face plies the characteristics of the faces can be controlled by varying the materials comprising the stiffening elements used therein, the number of layers of material forming each element, the orientation of the elements relative to the woven article, and the size, particularly the thickness of the stiffening elements. Moreover the space between the face plies forming each face can be varied as desired such as during the weaving of the fabric.

BRIEF DESCRIPTION OF THE DRAWINGS

The foregoing and other objects, features and advantages of the invention will be apparent from the following more particular description of preferred embodiments of the invention, as illustrated in the accompanying drawings, in which:

FIGS. 4A and 4B are perspective views of multi-ply woven articles in accordance with the invention illustrating the manner in which unidirectional fibers comprising the stiffening elements may be oriented so as to provide the woven article with maximum strength in selected directions;

FIG. 5 is a block diagram of the various steps in a preferred method of making a woven article in accordance with the invention;

FIG. 6 is a block diagram of the various steps in a preferred method of making the stiffening elements in accordance with the invention; and FIGS. 7A and 7B are perspective views of a multi-ply woven article in accordance with the invention illustrating the manner in which stiffening elements made of expendible material may be used to advantage during fabrication of the woven article.

DETAILED DESCRIPTION

Figure 1:
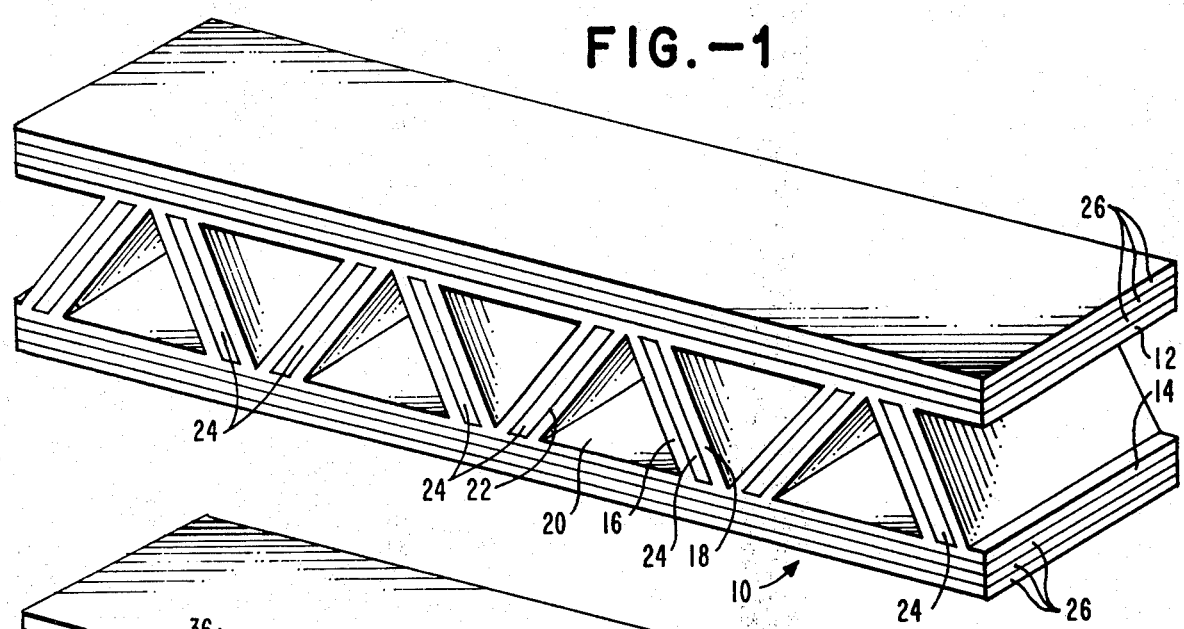
FIG. 1 is a perspective view of one form of multiply woven article in accordance with the invention.

FIG. 1 depicts a multi-ply woven article 10 having single face plies 12 and 14 and double rib plies 16 and 18. The rib plies 16 and 18 which are generally parallel to one another extend alternately between the opposite face plies 12 and 14 in generally zig zag fashion so as to define a plurality of triangular-shaped open spaces 20 with the opposite face plies 12 and 14. Each rib portion of the article 10 as defined by the respective portions of the rib plies 16 and 18 extending between the opposite face plies 12 and 14 defines an elongated, generally planar pocket 22. Each pocket 22 which extends substantially through the entire width of the woven article 10 is adapted to receive therein a stiffening element 24 of similar size and shape. Multiple layers of generally stiff, planar face reinforcing elements 26 are affixed on the outsides of the face plies 12 and 14 opposite the intermediate rib plies 16 and 18 so as to be generally coextensive with the respective face plies 12 and 14.

The details and method of weaving the woven fabric of FIG. 1 as comprised of the face plies 12 and 14 and the rib plies 16 and 18 are described in a copending application, Ser. No. 290,546, filed Sept. 20, 1972, now abandoned Walter A. Rheaume, Multi-ply Woven Article Having Double Ribs, which application is assigned to the same assignee as the present application. As described in that application each of the rib plies 16 and 18 is interwoven with the opposite face plies 12 and 14. Also the rib plies 16 and 18 are interwoven with one another at each area of interweaving with one of the opposite face plies 12 and 14. A woven fabric of the type described distinguishes over prior art woven fabrics of this type in a number of respects including the use of parallel, spaced apart rib plies to form each rib portion. As previously noted prior art woven articles of the type having single ribs have relatively low compressive strengths among other things. Despite the resin impregnation and subsequent curing of the individual rib plies, such plies tend to buckle, crumple or otherwise fail when the woven article is subjected to substantial compressive forces. The individual face plies, despite some stiffening thereof by resin impregnation and curing, are similarly subject to failure, particularly when a concentrated compressive load is applied to either of the faces. Both the rib plies and the face plies of such prior art structures are subject to failure from various forces in addition to those of the compressive type. For example if the opposite ends of the woven article are supported so as to form a beam, the various face plies and rib plies may be damaged or may fail if too much of a load is applied to the central region of the beam.

In accordance with the invention the resistance of a woven article of the type described to compressive and other forces is greatly increased by the use of the double rib plies 16 and 18 in combination with the stiffening elements 24. As previously noted the rib plies 16 and 18 define the elongated, generally planar pockets 22 configured so as to receive the stiffening elements 24 which are relatively thin and therefore light in weight. It will be appreciated by those skilled in the art that the various stiffening elements 24 and the adjacent portions of the rib plies 16 and 18 combine with the face plies 12 and 14 to provide a triangulation or truss effect. Since the reinforced ribs provide all the strength that is necessary for most uses of the article 10 the triangular-shaped open spaces 20 need not be used and may be left open where desired.

The various stiffening elements 24 form substantially integral parts of the respective ribs. As described in detail hereafter the stiffening elements 24 are inserted in the pockets 22 after the woven fabric including the rib plies 16 and 18 has been impregnated with resin. When the resin is cured by subjecting it to elevated temperatures and pressures the stiffening elements 24 are joined to the rib plies 16 and 18, forming substantially integral ribs.

In the particular woven article 10 of FIG. 1 the woven portions of the opposite faces comprise the single face plies 12 and 14. As previously noted single face plies, even when resin impregnated and cured, seldom have the stiffness or strength necessary to withstand the application of localized forces on the faces of the article 10. One way of compensating for this is to add one or more of the face reinforcing elements 26 to each of the face plies 12 and 14. As described in detail hereafter the reinforcing elements 26 may comprise the same materials as the stiffening elements 24, prepared and bonded together in the same way. Much in the same manner as the stiffening elements 24 are bonded to the rib plies 16 and 18 so as to become substantially integral therewith, the reinforcing elements 26 are bonded to the opposite face plies 12 and 14 during curing so as to become substantially integral therewith.

The opposite faces of the woven article 10 as greatly strengthened and stiffened by the addition of the reinforcing elements 26 complement the ribs as greatly strengthened and stiffened by the stiffening elements 24 so as to provide a woven article 10 which is very strong, particularly with respect to compressive forces. It will be readily appreciated that when the article 10 is subjected to compressive forces the faces as reinforced by the elements 26 are highly resistant to damage or failure. The internal ribs are reinforced by the stiffening elements 24 combine with the reinforced faces to provide the triangulation or truss effect which prevents one of the faces from being moved inwardly toward the other face so as to effectively crush the panel formed by the article 10. As will become more apparent from the discussion to follow the improved woven article 10 of FIG. 1 is stronger in other respects as well.

Figure 2:
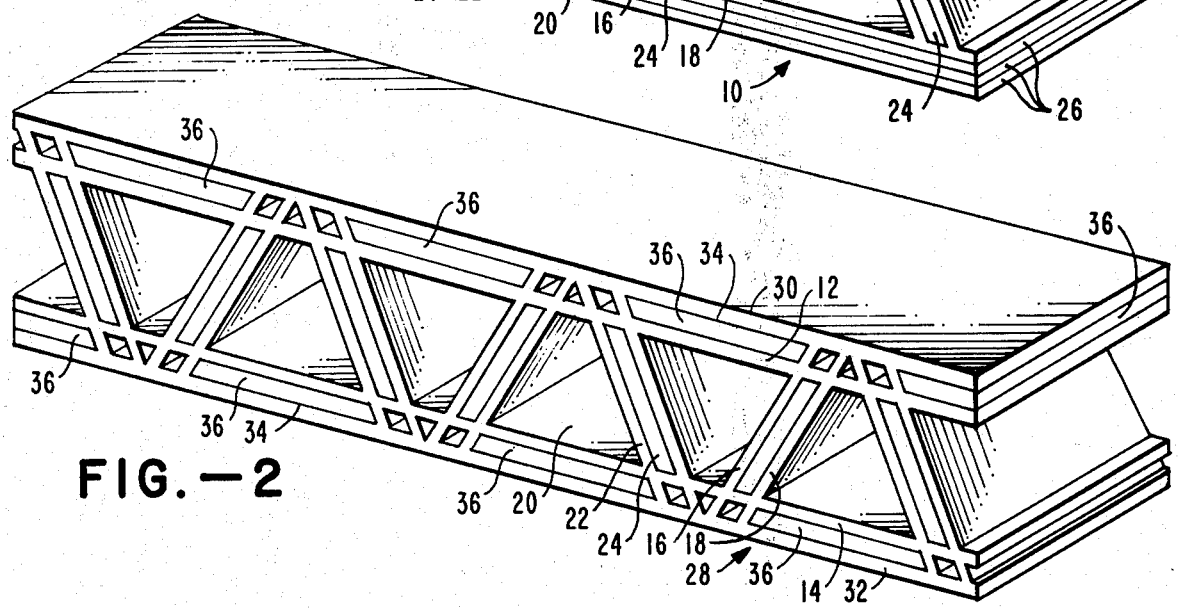
FIG. 2 is a perspective view of an alternative form of multi-ply woven article in accordance with the invention.

A preferred alternative arrangement of a woven article 10 in accordance with the invention is illustrated in FIG. 2. The article 28 of FIG. 2 is similar to the article 10 of FIG. 1 in that it includes woven rib plies 16 and 18 and woven face plies 12 and 14. However, the article 28 has an additional pair of face plies 30 and 32, each of which is associated with a different one of the face plies 12 and 14. Thus the face ply 30 which is generally planar in configuration is disposed in generally parallel, spaced apart relation to the upper face ply 12. Similarly the face ply 32 which is generally planar is disposed in parallel, spaced apart relation to the lower face ply 14. As in the case of FIG. 1 the rib plies 16 and 18 combine with the face plies 12 and 14 to define the generally planar pockets 22 therebetween for receiving the mating stiffening elements 24. In the arrangement of FIG. 2 the various rib plies 16 and 18 intersect and are interwoven with the various face plies 12, 14, 30 and 32 so as to form a second plurality of generally planar pockets 34 between the opposite pairs of face plies. Thus the upper face plies 12 and 30 form a plurality of pockets 34 therebetween. Similarly the lower face plies 14 and 32 form pockets 34 therebetween. Each of the generally planar pockets 34 is filled with an elongated, generally planar stiffening element 36 of similar size and shape.

The details of a woven fabric of the type used in the arrangement of FIG. 2 as well as the method of weaving the same are described in a copending application, Ser. No. 290,543, filed Sept. 20, 1972, now abandoned Walter A. Rheaume and Donald M. Hatch, Multi-ply Woven Article Having Double Faces, which application is assigned to the same assignee as the present application. As described in that application the fabric is integrally woven such that the rib plies 16 and 18 are interwoven with each of the four different face plies 12, 14, 30 and 32. Also the rib plies 16 and 18 are interwoven with each other at the areas of interweaving of the rib plies with the outer face plies 30 and 32.

Like the woven article 10 of FIG. 1 the stiffening elements 24 in the article 28 of FIG. 2 become bonded to the rib plies 16 and 18 during resin impregnation and curing so as to become substantially integral therewith. However whereas in the arrangement of FIG. 1 the reinforcing element 26 must be added to strengthen and stiffen the opposite faces, the arrangement of FIG. 2 eliminates the need for such reinforcing elements while at the same time providing for stiffening elements 36 which become substantially integral with the face plies 12, 14, 30 and 32 during resin impregnation and curing.

It will thus be appreciated by those skilled in the art that the woven article 28 of FIG. 2 functions much in the same way as the article 10 of FIG. 1 to provide substantial resistance to compressive forces as well as other types of forces. In addition the opposite face plies 12, 14, 30 and 32 of the woven article 28 in FIG. 2 are completely interwoven with the rib plies 16 and 18. The result is a superior intercoupling of the opposite face plies and the substantially integral stiffening elements 36 with the ribs.

FIGS. 3A–3G provide examples of different ways in which the stiffening elements 24 and 36 and the face reinforcing elements 26 can be constructed.

Figure 3A:
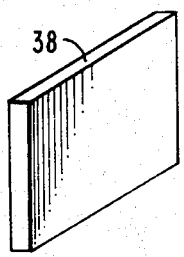
FIGS. 3A–3G are perspective views, in some cases partially broken away, of various different material composites which may be used to form the stiffening elements in accordance with the invention.

FIG. 3A depicts an element 38 which may comprise one of the stiffening elements 24, one of the stiffening elements 36 or the face reinforcing elements 26. The element 38 comprises a single layer of appropriate material. Ideally the material or materials used to form the various elements are stiff and strong, yet lightweight and inexpensive. Where strength is the primary consideration materials such as fiberglass and aluminum are often used. Also the material used can comprise high modulus graphite which is even stiffer although relatively expensive. It may also be desirable for certain applications to choose the materials comprising the various elements for their thermal or insulating properties.

The size and shape of the stiffening elements such as the element 38 of FIG. 3A depends upon the size and shape of the various pockets 22 and 34 formed within the woven article. Ideally the various stiffening elements are made so as to approximate the size and shape of the respective pockets in which they are to be used. Thus where the woven article is approximately ¾ inch thick the various stiffening elements will typically be on the order of ½ to ⅝ inch wide and as long as the woven fabric is deep. The thickness of the stiffening elements in articles of approximately this size is typically between 0.040 and 0.080 inch.

Figure 3B:
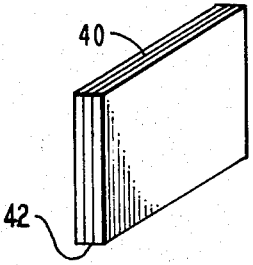

In the arrangement of FIG. 3B the stiffening elements or face reinforcing element comprises a laminate 40 made up of two or more different layers 42 of appropriate material. The various layers 42 may all be comprised of the same material, or alternatively may be comprised of different material. The particular arrangement of FIG. 3B offers some latitude in the selection of different materials chosen for their various different properties. Also it is a convenient way of building up the elements to the desired thickness where the various different layers 42 are normally available only in relatively narrow widths.

Figure 3C:
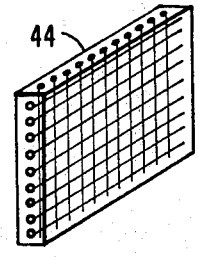

In the example of FIG. 3C the stiffening element or face reinforcing element is comprised of a single piece 44 of woven fabric which may be woven in much the same way and of the same material as the woven fabric comprising the article and which may be resin impregnated and cured in much the same manner. As discussed hereafter in connection with FIG. 6 elements of the type shown in FIG. 3C are readily fabricated by weaving the fabric, resin impregnating the fabric, curing the fabric, and thereafter cutting the fabric so as to provide the individual stiffening elements.

Figure 3D:
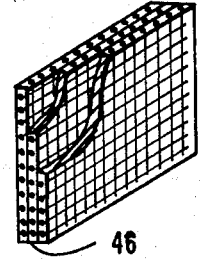

The arrangement of FIG. 3D is like that of 3B in that the stiffening element or face reinforcing element is comprised of a plurality of different layers 46. However in the particular arrangement of FIG. 3D the various layers 46 each comprise a piece of treated fabric. Thus if a piece of fabric as woven, resin impregnated and cured is too thin to form a complete stiffening element as in the case of FIG. 3C, two or more layers of such fabrics may be formed together as in the case of FIG. 3D to provide the stiffening element.

It should be understood that while the example of FIG. 3D shows all of the various layers 46 thereof as being comprised of woven fabrics, some of the layers can comprise woven fabrics with still other layers being comprised of different materials. In this respect the arrangement of FIG. 3B represents an element in which the various different layers 42 can comprise different materials or like materials as desired.

Figure 3E:
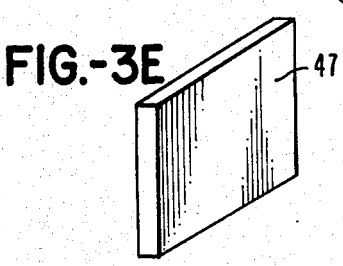

In FIG. 3E the stiffening element or face reinforcing element comprises a single thickness or layer 47 of an appropriate metal such as aluminum. Aluminum has been found to provide elements which are strong, yet relatively inexpensive and lightweight.

Figure 3F:
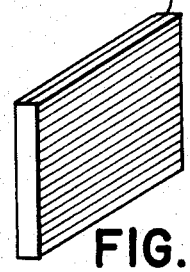

In the arrangement of FIG. 3F the stiffening element or face reinforcing element is comprised of a single layer 48 of a unidirectional material such as boron, high modulus graphite or fiberglass. As will be seen the fibers of the layer 48 extend in a generally common direction, and typically provide the layer 48 with superior tensile strength in the direction of the fibers.

Figure 3G:
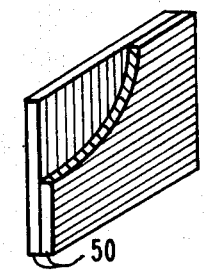

The arrangement of FIG. 3G is similar to that of FIG. 3F except that the stiffening element or face reinforcing element is comprised of a plurality of different layers 50 of unidirectional material. The various different layers 50 may comprise the same material or may comprise different unidirectional materials. Where two or more different layers 50 of unidirectional material are joined together to form an element, such layers are oriented relative to one another so as to achieve desired strength characteristics. In the particular example of FIG. 3G the different layers 50 are oriented such that the common directions of the respective fibers thereof are generally 90° removed from one another. In actual use the different layers 50 can be arranged so as to form a variety of different angles. Also the element can be fabricated so that when it is placed in its pocket within the woven fabric or on the outsides of the face plies thereof the various different layers 50 form selected angles with respect to the various dimensions of the woven fabric. This is illustrated in FIGS. 4A and 4B.

FIGS. 4A and 4B provide examples of how stiffening elements which comprise unidirectional fibers can be selectively oriented relative to the woven article to maximize the strength of the article in certain directions. Both FIGS. 4A and 4B illustrate lengths of a woven article 52 and 54 respectively being used as a structural beam. In both cases the beam so formed is supported at its opposite ends so as to be suspended therebetween. It is also assumed that a downwardly acting force or forces are exerted on the beams in a central region thereof between the opposite supported edges.

As described in the previously referred to applications, Ser. No. 290,546 and Ser. No. 290,543, woven articles of the type shown in FIGS. 4A and 4B are woven on a flat loom such that the width thereof defined by the dimensions $d$ in both instances is limited by the width of the loom. Ideally the woven article is arranged such that the width dimension $d$ thereof spans the gap between the opposite support points as in the case of FIG. 4B. However the span for the beam formed by the woven article may be greater than the width $d$, in which case the woven article must be oriented as shown in FIG. 4A.

In the arrangement of FIG. 4A a portion of the upper face of the woven article 52 including the upper face ply is not shown in order to illustrate the manner in which stiffening elements of unidirectional material may be oriented. The top face is shown to include a plurality of stiffening elements 56 having the common directions of the fibers thereof oriented generally perpendicular with respect to the width dimension $d$ and parallel to the length direction of the article 52. While not shown in FIG. 4A the stiffening elements within the bottom face and the ribs would most likely also be oriented in the same general direction as the stiffening elements 56. Since the stiffening elements 56 have their greatest tensile strength in the direction of the fiber orientation, the orientation of the elements 56 as shown maximizes the strength of the article 52 along the length dimension thereof. Accordingly the article 52 has considerable resistance to the downwardly acting forces in the central region thereof when supported at the opposite edges as shown in FIG. 4A.

As previously noted the article 54 of FIG. 4B is arranged such that the width dimension $d$ extends along the length of the beam formed thereby. As in the case of FIG. 4A portions of the upper face of the article 54 have been removed in order to illustrate the orientation of a plurality of stiffening elements 58 comprised of unidirectional fibers. Unlike the case of the article 52 of FIG. 4A the various stiffening elements 58 in the article 54 of FIG. 4B are oriented such that their common directions are generally parallel to the width dimension $d$. However as in the case of FIG. 4A the common directions of the stiffening elements 58 extend generally in the direction between the opposite regions of support for the article 54. Although not shown in FIG. 4B the various stiffening elements within the ribs and the lower face are also preferably oriented in the same general direction as the elements 58.

FIGS. 4A and 4B provide examples of the many ways in which stiffening elements comprising unidirectional fibers can be oriented relative to the woven article to provide desired strength characteristics. Where the stiffening elements comprise a single layer of unidirectional material it is a simple matter of orienting each stiffening element or set thereof in a particular direction or directions. Where each stiffening element comprises a laminate of different layers of unidirectional material the various different layers of the laminate are oriented relative to each other to provide the stiffening element formed thereby with desired strength characteristics. The individual layers are also oriented such that the stiffening element when placed in the woven article provides the article with desired strength characteristics.

Similar considerations apply when unidirectional materials are used to form the face reinforcing elements 26 in a single face ply article of the type shown in FIG. 1. Where a single layer is used as in the case of FIG. 3F, the layer is oriented relative to the associated face to achieve desired strength characteristics. Where multiple layers are used, the various layers are selectively oriented relative to each other and to the faces of the woven article to achieve desired results.

FIG. 5 illustrates the various steps involved in one preferred method of making a woven article in accordance with the invention. As seen in FIG. 5 the first step of the manufacturing process is the weaving of the multi-ply fabric. As previously noted weaving of fabrics of the type used in the arrangements of FIGS. 1 and 2 are respectively described in the previously referred to applications, Ser. No. 290,546 and Ser. No. 290,543, respectively. As described in those applications the yarns used to weave the fabric may comprise any appropriate material such as fiberglass. A second step of the manufacturing process which may be carried out simultaneously with the weaving of the fabric is that of making the stiffening elements and in the case of a single face ply arrangement of the type shown in FIG. 1 the face reinforcing elements as well. The elements can be made from any appropriate process, which will depend in part on the materials used. For example if the elements are to comprise single layers of a metal such as aluminum as in the case of FIG. 3E, such elements can be made by cutting elements of appropriate length and width from a sheet of metal of appropriate thickness. Where the various elements comprise laminates of different layers of material, the various layers are first prepared or made to the extent necessary, after which they are bonded together in appropriate fashion to form the elements.

One preferred method of making the stiffening elements or the face reinforcing elements from woven fabric or from unidirectional fibers as in the cases of FIGS. 3C, 3D, 3F and 3G is illustrated in FIG. 6. According to the method of FIG. 6 the first step is to lay-up the woven fabric or the fibers including impregnating them with an appropriate resin such as an epoxy or polyester. Where the element is to comprise a laminate of two or more layers, the appropriate number of layers of the fabric or fibers are stacked together during the lay-up. Thereafter the fabric or fibers are subjected to elevated temperatures and pressures, at least to the extent necessary to debulk the material. The material must be debulked in order for it to fit properly within the various pockets in or on the faces of the woven fabric. In some cases it may be desirable to continue the heating under reduced pressure to the extent necessary to actually cure the material. However this is not normally necessary since, as is described hereafter, the formed elements are subjected to further cure during fabrication of the woven article. Following debulking or curing of the fabric or fibers, the fabric or fibers are cut so as to form the individual stiffening elements during a third step of the process of FIG. 6.

Following the weaving of the multi-ply fabric and the making of the stiffening elements, the next step is to lay-up the fabric as seen in FIG. 5. This includes impregnation of the fabric with a resin. Thereafter the stiffening elements are inserted into the pockets formed within the woven fabric. In the case of FIG. 1 stiffening elements are inserted into the ribs only. As previously noted the face reinforcing elements will often comprise the same elements used to form the stiffening elements, in which case the face reinforcing elements and the stiffening elements are made at the same time. Of course while the stiffening elements are formed by cutting the debulked or cured material into appropriate sizes, the face reinforcing elements invariably involve debulked or cured material of considerably larger size which may be cut as necessary to make it essentially the same size as the mating face plies of the woven fabric. In making an arrangement such as that of FIG. 2 the formed stiffening elements are inserted into the faces at the same time as they are inserted into the ribs.

Insertion of the stiffening elements into the woven fabric is followed by insertion of mandrels into the open spaces within the woven fabric. Mandrels are normally inserted in the open spaces of multi-ply, three-dimensional woven fabrics of this type to hold the fabric rigid and erect during curing of the resin. In the case of the present invention the various stiffening elements may prove capable of supporting the woven fabric so as to eliminate the need for mandrels, especially in the case of the FIG. 2 arrangement. However use of the mandrels within the generally triangular-shaped open spaces is generally preferred. Where desired the open spaces can be filled with inserts of the type which are allowed to remain as a permanent part of the article. As previously noted it is common practice in the prior art to fill the open spaces with inserts made of lightweight materials such as foam. However such materials are typically used in prior art structures to provide some increase in the article's resistance to compressive forces as well as to hold the fabric erect and rigid during curing. In the present invention these functions are generally performed by the stiffening elements, thereby eliminating the need for inserts of foam or similar construction. Moreover as noted above the use of stiffening elements within the double ply woven configurations of the present invention impart compressive and other strengths to the woven article which are many times those of prior art structures including those which incorporate foam or other inserts within the open spaces.

With the stiffening elements and any face reinforcing elements in place and mandrels inserted within the open spaces in the fabric, the resulting arrangement is cured by subjecting it to high temperatures and pressures in the usual fashion. During the curing step the resin is hardened making the woven article into a stiff and rigid panel. At the same time the various elements which have been previously debulked or cured are subjected to further curing so as to become substantially integral with the various adjacent fabric plies. Upon completion of curing the mandrels are removed from the open spaces, thereby completing fabrication of the woven article.

As previously noted the present invention provides for woven articles which are extremely strong and yet relatively lightweight and inexpensive through use of the relatively thin, generally planar stiffening elements within the pockets formed by double plies of the woven fabric. The relatively thin stiffening elements are positioned by the various pockets within which they are received so as to maximize the strength of the woven article using a truss effect as well as other effects. A relatively rigid and strong woven article can be made using the single ply woven fabrics of the prior art in combination with strong and rigid inserts which are placed within the open spaces. However the inserts required to fill the open spaces in the fabric are sufficiently large so as to require a considerable amount of material in filling the open spaces. Most materials which are of sufficient stiffness and rigidity not only render the resulting article excessively expensive because of the large volumes of such material which must be present but also render them sufficiently heavy so as to make them impractical for many applications.

One facet of the superior compressive strength of woven articles in accordance with the invention is the truss effect provided by the ribs. This effect is provided by the spaced apart pairs of rib plies as well as the use of the stiffening elements therebetween. It has been found that while the stiffening elements themselves greatly enhance the compressive strength of the article the fact that the adjacent rib plies are spaced apart by considerable distances also serves to increase the strength of the article. Thus for some applications it may merely be sufficient to provide the various ribs with stiffening elements which primarily serve to hold the adjacent rib plies in spaced apart relation to one another. In such instances the rib stiffening elements are preferably comprised of material which has a moderate amount of strength but which is particularly light in weight. An alternative approach in accordance with the invention is the use of rib stiffening elements which serve to hold the rib plies in parallel, spaced apart relation during fabrication of the woven article, following which the stiffening elements burn out or are otherwise consumed so as to leave the various rib pockets in the finished article open. This technique is illustrated in FIGS. 7A and 7B.

FIG. 7A depicts a portion of a woven fabric 60 having a pair of rib plies 62 and 64 defining elongated, generally planar pockets 66 therebetween. A plurality of stiffening elements 68 are shown being inserted into the pockets 66. In the present example the elements 68 are comprised of a "fugitive" material such as a resin which will burn out or otherwise disintegrate during curing of the woven fabric 60. For example the stiffening elements 68 can comprise a "low temperature" or fugitive resin such as the material sold under the trademark "Teflon" by E. I. Du Pont de Nemours & Company. At the same time the woven fabric 60 is impregnated with a "high temperature" resin such as a phenolic or a polymide.

During curing of the woven fabric 60 the fabric is subjected to a temperature which is higher than the fugitive resin comprising the elements 68 can withstand but within the range of temperatures that the high temperature resin within the fabric 60 can tolerate. As a result the low temperature or fugitive resin burns out during curing so as to vacate the pockets 66 while at the same time building up and rigidifying the rib plies 62 and 64. The result is seen in FIG. 7B.

As seen in FIG. 7B the various pockets 66 are open. At the same time the various rib plies 62 and 64 are well separated from each other as well as being substantially strengthened and rigidified. This provides for a woven article which is relatively strong and yet very light in weight.

It will be appreciated by those skilled in the art that woven articles in accordance with the invention can be specifically designed to meet virtually any necessary requirements by making appropriate choices among the many possible variables and alternatives. As already noted the stiffening elements can be varied in terms of such things as the material used, the number of plies present, the size, particularly the thickness, and the orientation relative to the woven fabric. The trusses formed by the rib plies can likewise be varied such as by controlling the distance between the adjacent pair of rib plies during weaving of the fabric, by varying the size, particularly the thickness of the stiffening elements, and by using fugitive stiffening elements which disappear in the completed product. Where desired the gap or spacing between adjacent rib plies at each area of interweaving thereof with one of the faces can be varied such as during weaving of the fabric.

Similar considerations apply to the faces of the woven articles. Thus the stiffening elements used within the faces can be varied by choice of materials and sizes thereof, the number of plies used, and the orientation of the finished elements. Similarly where single face plies are present as in the arrangement of FIG. 1 the characteristics of the resulting faces can be varied by appropriate choice of the materials, number of laminations and the size thereof comprising the face reinforcing elements. Where desired the stiffening elements within the face can be made of a fugitive material so as to burn out, as in the case of the rib stiffening elements. The spacing between the face plies can be varied both during the weaving of the woven fabric and through some variation in the thickness of the stiffening elements.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A multi-ply woven structural panel comprising a woven fabric having a pair of opposite, spaced-apart, generally planar faces and a pair of spaced-apart intermediate rib plies of generally planar configuration extending between and being interwoven with the opposite faces, the faces and the rib plies defining a plurality of major chambers within the panel and between the opposite faces, the pair of intermediate rib plies alternately extending between the opposite faces in a zig zag configuration and providing the major chambers with generally triangular-shaped cross section, the pair of intermediate rib plies defining relatively thin, generally planar chambers which border the major chambers and have a thickness many times less than the thickness of the major chambers defined by the distance between the opposite faces, and a plurality of relatively thin, generally planar elements of size and shape similar to and disposed within the relatively thin, generally planar chambers, the relatively thin, generally planar elements providing the panel with substantial strength and rigidity.

2. The invention defined in claim 1, wherein at least one of the opposite faces is comprised of a further pair of generally planar, parallel, spaced-apart plies which define a second plurality of relatively thin, generally planar chambers having a second plurality of relatively thin, generally planar elements of size and shape similar to and disposed within the second plurality of thin, planar chambers, the further pair of plies and the second plurality of thin, planar elements disposed in the second plurality of thin, planar chambers therebetween forming a thin composite member which provides a rigid outer skin for the thick, hollow panel and which forms a boundary for the hollow interior of the panel.

3. The invention defined in claim 1, wherein each of the relatively thin, generally planar chambers defined by the rib plies extends the entire distance between the faces in the direction of the planes thereof, and the plurality of relatively thin, generally planar elements of size and shape similar to and disposed within the plurality of thin, planar chambers provide substantial resistance to movement of the faces relative to each other when the panel is subjected to forces.

4. The invention defined in claim 3, further including a laminate of generally planar reinforcing elements fastened to the side of at least one of the faces opposite the ribs so as to be generally coextensive with the face.

5. The invention defined in claim 1, wherein at least some of the generally planar elements are each comprised of at least two elongated, generally planar layers of relatively stiff composition bonded together to form a laminate.

6. The invention defined in claim 5, wherein each of the layers is comprised of unidirectional fibers and the different layers have the fibers thereof oriented in selected directions relative to each other to enhance the strength of the stiffening element in selected directions.

7. A woven fabric panel comprising a pair of opposite broad faces disposed in parallel, spaced-apart, coextensive relation along the length of the fabric, at least one of the faces being comprised of a pair of parallel, spaced-apart, coextensive plies of the woven fabric, each ply including transverse fill yarns spaced along the length of the fabric and longitudinal warp yarns extending along the length of the fabric and interwoven with the fill yarns, at least one rib ply comprised of transverse fill yarns spaced along the length of the fabric and longitudinal warp yarns which extend substantially along the entire length of the fabric and which are interwoven with the fill yarns, the rib ply being alternately interwoven with the opposite faces at spaced intervals along the length of the fabric, the interweaving of the rib ply with said one of the faces comprised of a pair of plies dividing the spaced between the pair of plies into a series of thin, planar spaces along the length of the fabric, each of the thin, planar spaces having a length in the direction of the length of the fabric and a thickness in a direction normal to the planes of the pair of plies which is substantially less than the length and is many times less than the distance between the opposite faces, and a plurality of relatively thin, generally planar elements of relatively hard material disposed within different ones of the thin, planar spaces.

8. A woven fabric panel comprising a pair of opposite broad faces disposed in parallel, spaced-apart relation along the length of the fabric, each of the faces being comprised of at least one ply of the woven fabric including transverse fill yarns spaced along the length of the fabric and longitudinal warp yarns extending along the length of the fabric and interwoven with the fill yarns, a pair of rib plies, each of which is comprised of transverse fill yarns spaced along the length of the fabric and longitudinal warp yarns which extend substantially along the entire length of the fabric and which are interwoven with the fill yarns, each of the rib plies being alternately interwoven with the plies comprising the opposite faces at spaced intervals along the length of the fabric, the pair of rib plies being disposed in generally parallel, spaced-apart relation between the opposite faces to define a series of thin, planar openings, each of which extends in a given direction through the entire distance between the opposite faces to define the length thereof and has a thickness in a direction normal to said given direction which is substantially smaller than the length thereof, the pair of rib plies and the thin, planar openings therebetween dividing the space between the opposite faces into a plurality of spaces considerably larger in cross-sectional area than the thin, planar openings, each of the spaces extending between the opposite faces and being bounded on opposite sides by different ones of the thin, planar openings, and a plurality of relatively thin, generally planar elements of relatively stiff material disposed within different ones of the thin, planar openings.

* * * * *